United States Patent
Tyler et al.

(10) Patent No.: US 10,779,685 B2
(45) Date of Patent: Sep. 22, 2020

(54) EGG PEELER DEVICE ACCESSORIES

(71) Applicants: Margaret B. Tyler, Fairfield, CT (US); Sheila M. Torgan, Wilton, CT (US)

(72) Inventors: Margaret B. Tyler, Fairfield, CT (US); Sheila M. Torgan, Wilton, CT (US)

(*) Notice: Subject to any disclaimer, the term of this patent is extended or adjusted under 35 U.S.C. 154(b) by 303 days.

(21) Appl. No.: 15/917,102

(22) Filed: Mar. 9, 2018

(65) Prior Publication Data
US 2019/0274483 A1  Sep. 12, 2019

(51) Int. Cl.
*A47J 43/14* (2006.01)
*A47J 17/02* (2006.01)
*A23N 15/08* (2006.01)

(52) U.S. Cl.
CPC .............. *A47J 43/14* (2013.01); *A23N 15/08* (2013.01); *A47J 17/02* (2013.01)

(58) Field of Classification Search
CPC ........... A47G 19/28; A47J 43/14; A47J 17/02; A23N 15/08; A23N 7/00
USPC ................... 99/568, 571, 577, 586, 587, 588
See application file for complete search history.

(56) References Cited

U.S. PATENT DOCUMENTS

| | | | | |
|---|---|---|---|---|
| 2,501,679 A | * | 3/1950 | Kelley | A47G 19/28 99/576 |
| 3,656,525 A | * | 4/1972 | Goodart | A47J 43/14 99/499 |
| 4,344,359 A | * | 8/1982 | Frechou | A47J 43/145 99/580 |
| 6,303,915 B1 | * | 10/2001 | Young | A23J 1/09 219/733 |
| 2009/0145308 A1 | * | 6/2009 | Chih | A47G 19/28 99/568 |
| 2014/0079851 A1 | * | 3/2014 | Osterberg | A47J 43/14 426/298 |
| 2014/0193550 A1 | * | 7/2014 | Wang | A47J 43/14 426/298 |
| 2019/0008298 A1 | * | 1/2019 | Gifford | A47G 19/28 |

* cited by examiner

*Primary Examiner* — Sarang Afzali
*Assistant Examiner* — Darrell C Ford
(74) *Attorney, Agent, or Firm* — John L. Sotomayor

(57) ABSTRACT

The egg peeler device accessories comprise replaceable top caps for an egg peeler such that each replaceable top cap reconfigures the egg peeler to perform a specific task. The replaceable top caps fit onto the top end of a body of the egg peeler in place of an original top cap. The first replaceable top cap reconfigures the egg peeler to separate egg yolks and egg whites. This cap comprises a plurality of slots around a concave portion of the cap such that egg whites flow through the plurality of slots while the egg yolk remains in the cap. The second replaceable top cap reconfigures the egg peeler to peel one or more cloves of garlic. The cloves are placed within the body and shaken where they strike spikes projecting from the inside surface of the second replaceable top cap, separating the coves and peeling them.

9 Claims, 6 Drawing Sheets

EGG PEELER DEVICE ACCESSORIES

PRIORITY CLAIM

This Non-Provisional application is a Continuation-in-Part of Non-Provisional application Ser. No. 15/156,785, filed May 16, 2016 and Titled "Personal Egg Peeler", and which in turn claims priority to Provisional Application 62/163,062, filed May 18, 2015, and Titled "Personal Egg Peeler". This Non-Provisional application claims under 35 U.S.C. § 120, the benefit of priority to Non-Provisional application Ser. No. 15/156,785 and of Provisional Application 62/163,062, which are each hereby incorporated by reference in their entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates generally to food preparation, and specifically to preparing eggs and garlic for use in recipes. Separating egg whites (albumen) from egg yolks is a common step in many recipes and is difficult for some individuals to do correctly. As non-limiting examples, egg whites with no yolk may be required for whisking into a foam or for reducing the cholesterol intake of the person eating the food prepared from the egg. The task of separating whites and yolks may be complicated by the presence of the vitelline membrane which surrounds the egg white. This membrane may pull on the yolk and may break the yolk open during the separation process.

Another common kitchen task is to remove the peel from one or more cloves of garlic in preparation for chopping, grating, or pressing the garlic.

Both of these tasks may be time consuming, especially if any quantity of egg whites or peeled garlic is needed.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
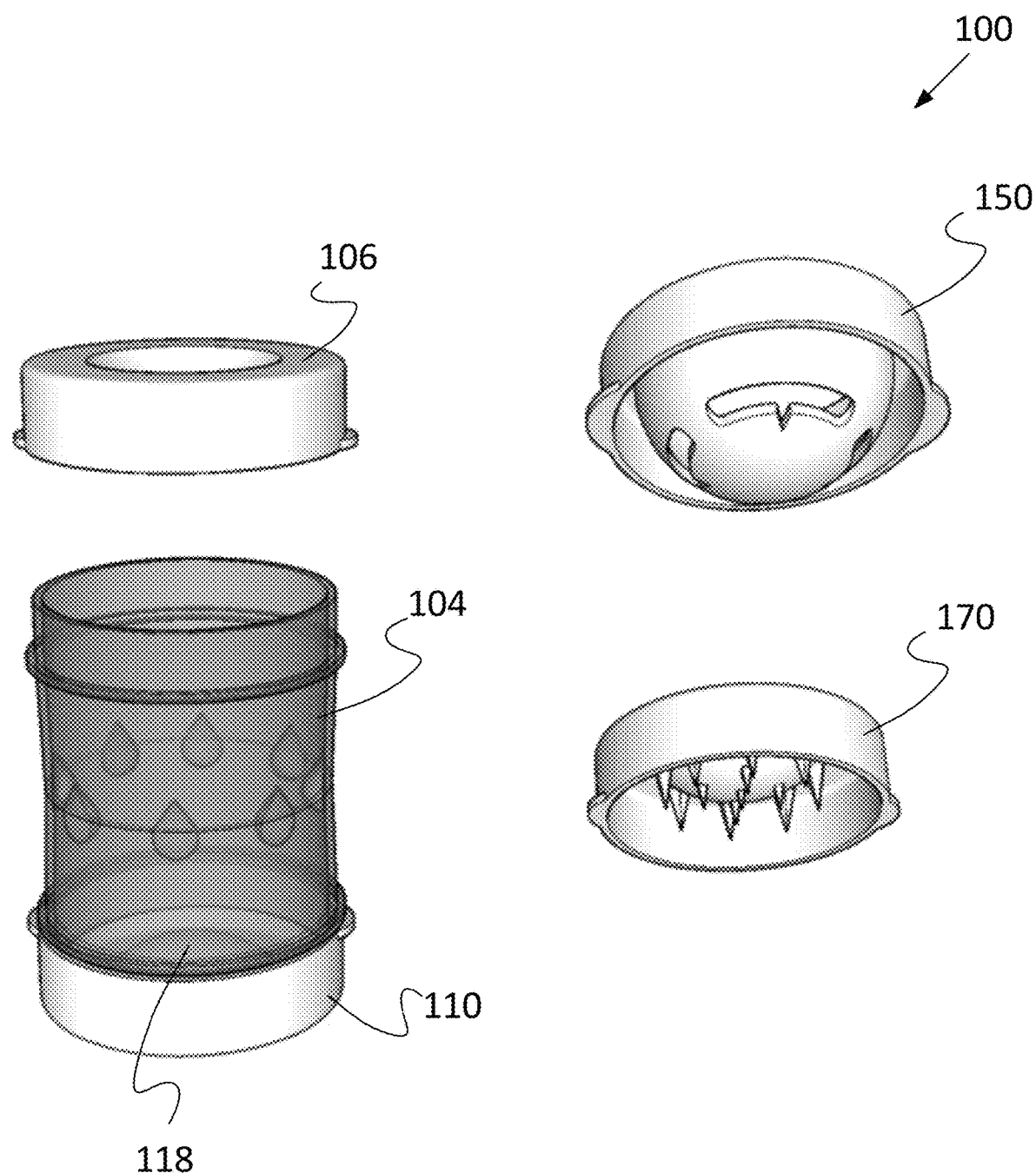
FIG. 1 is a view of an egg peeler body, top cap, and bottom cap along with two replacement caps that reconfigure the egg peeler for other purposes consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used herein, an "arc of a circle" is a section of the circumference of a circle.

As used in this disclosure, "concave" is used to describe a surface that resembles the interior surface of a sphere or a portion thereof.

As used in this disclosure, "convex" is used to describe a surface that resembles the exterior surface of a sphere or a portion thereof.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, the term "friction fit" refers to a type of mechanical coupling where a first component presses into a second component and is held there only by the friction of the first component against the second component. A friction fit may also be known as a press fit.

As used in this disclosure, a "gasket" is an elastomeric material that is placed between a first surface and a second surface for the purpose of creating a liquid or gas impermeable seal between the first surface and the second surface or preventing the first surface from damaging the second surface (or vice versa).

As used in this disclosure, the word "interior" is used as a relational term that implies that an object is located or contained within the boundary of a structure or a space.

As used herein, the words "invert", "inverted", or "inversion" refer to an object that has been turned inside out or upside down or to the act of turning an object inside out or upside down.

As used in this disclosure, a "notch" is an indentation formed in an edge or a cavity or aperture formed within a surface.

As used in this disclosure, "resilient" or "semirigid" refer to an object or material which will deform when a force is applied to it and which will return to its original shape when the deforming force is removed.

As used herein, a "ring" is a circular or surrounding line or mark.

As used in this disclosure, a "slot" is a long narrow groove, cut, opening, or aperture that is formed in or through an object.

As used herein, the word "watertight" refers to a barrier that is impermeable to water.

"Personal Egg Peeler" (non-provisional application Ser. No. 15/156,785, published as US20160338515A1 and provisional application 62/163,062) discloses an apparatus for peeling one or more hard boiled eggs. A personal egg peeler comprises a main body, a bottom end cap, and a top end cap. Egg peeler device accessories herein disclosed may use the main body and the bottom end cap of the personal egg peeler and may reconfigure the personal egg peeler for other kitchen tasks by replacing the top end cap.

The egg peeler device accessories comprise one or more replaceable top caps for the personal egg peeler. The personal egg peeler comprises the main body, the bottom end cap, and the top end cap. The top end cap is removed from the main body of the personal egg peeler and replaced by one of the one or more replaceable top caps. The one or more replaceable top caps configure the personal egg peeler to perform a specific task.

The main body may be cylindrical and may have a plurality of raised protrusions extending from the interior of the main body. The main body may removably couple to the bottom end cap via a bottom connector portion. The main body may removably couple to the top end cap via a top connector portion. The main body may be of sufficient diameter to permit the insertion of one or more eggs (not illustrated in the figures) produced by a commercial variety hen. However, this should in no way be considered limiting as the cylindrical main body may be sized to accommodate eggs lain by other species of fowl as well.

The bottom end cap may comprise a concave shaped portion as viewed from outside of the main body. Note that throughout this disclosure, surfaces that may be observed as being concave from outside of the main body may be observed as being convex from within the main body because of walls of the caps are generally of uniform thickness. The concave shaped portion of the bottom end cap may be adapted for shaking by a user with the concave shaped portion forming a grip where the bottom end cap may be firmly grasped when in use. This is especially true when combined with the top end cap which may also be concave in shape. As such, it is readily apparent that the concave shaped portion is not the only shape in which the bottom end cap and the top end cap may be manufactured. Additional shapes that permit a firm grasp of the top end cap and the bottom end cap of the personal egg peeler are equally disclosed as being consistent with the purpose of the concave shaped portion of the top end cap and the bottom end cap of the personal egg peeler. As non-limiting examples, other shapes that permit a firm grasp of the top end cap and the bottom end cap may comprise a flat surface with protrusions, a wavy surface, a central cone, or any other shaped indentation, The top end cap and the bottom end cap may be identical, with one being used in an inverted position. The top end cap and the bottom end cap may complete the enclosure of the apparatus when they are connected to the main body. The top end cap may comprise a sealing element which is a watertight connection between the main body and the top end cap. The bottom end cap may comprise the sealing element which is a watertight connection between the main body and the bottom end cap. As non-limiting examples, the sealing element may be a watertight connection such as a friction fit, a gasket, an o-ring, a screw type fastener, or any other type of fastener that keeps water sealed inside the main body when the end caps are secured to the top and bottom portions of the main body.

Egg Separator Top

A first replaceable top cap may configure the personal egg peeler to separate egg whites from egg yolks. The first replaceable top cap may be coupled to the top of the main body via the top connector portion. The first replaceable top cap may be of a diameter and shape to match the diameter shape of the top of the main body. The first replaceable top cap may be composed of a rigid material or of a resilient material. As non-limiting examples, the first replaceable top cap may be composed of acrylic plastic or of silicone rubber.

The first replaceable top cap may comprise the sealing element which is a watertight connection between the main body and the bottom end cap. As non-limiting examples, the sealing element may be a watertight connection such as a friction fit, a gasket, an o-ring, a screw type fastener, or any other type of fastener that prevents fluid from leaking from the boundary between the main body and the first replaceable top cap when the first replaceable top cap is secured to the top of the main body.

The first replaceable top cap comprises a plurality of slots. Each individual slot selected from the plurality of slots may be the shape of an arc of a circle. The distance from the center of the first replaceable top cap to any point on a line traversing the center of the individual slot is a constant for each of the plurality of slots. The width of the plurality of slots as measured from the lowest edge of the individual slot to the highest edge of the individual slot at any location on the individual slot except at a V-shaped notch or the ends may be such that the egg white may flow through the individual slot unimpeded.

The distance from the center of the first replaceable top cap to the lowest edge of the plurality of slots may be such that at least one of the egg yolks may be contained within a central depression without reaching the plurality of slots. The central depression may be defined as the concave shaped portion bounded by the plurality of slots. In some embodiments, there may be three of the individual slots comprising the plurality of slots.

Each of the individual slots may comprise the V-shaped notch. The V-shaped notch may be an opening in the first replaceable top cap where the egg white may begin to flow from the top side of a second replaceable top cap through the plurality of slots and into the main body. The V-shaped notch may be a V-shaped portion of material removed from the center of the bottom edge of the individual slot. The V-shaped notch may create two angular corners. The angular corners may cut a membrane of the egg (the vitelline membrane) so that the membrane does not pull on the egg yolk and break the egg yolk.

The first replaceable top cap may separate the egg white from the egg yolk when the egg is cracked open, the contents of the egg are poured into the concave shaped portion of the first replaceable top cap from the top, and the main body is rocked to allow the egg white and the membrane to flow through the plurality of slots into the main body. The egg yolk may remain inside the first replaceable top cap. The egg white may be collected inside of the main body.

Garlic Peeler Top

The second replaceable top cap may configure the personal egg peeler to peel one or more cloves of garlic. The second replaceable top cap may be coupled to the top of the main body via the top connector portion. The second replaceable top cap may be of a diameter and shape to match the diameter shape of the top of the main body. The second replaceable top cap may be composed of a rigid material. As non-limiting examples, the second replaceable top cap may be composed of acrylic or other rigid plastic.

The second replaceable top cap may comprise the sealing element which is a watertight connection between the main body and the bottom end cap. As non-limiting examples, the sealing element may be a watertight connection such as a friction fit, a gasket, an o-ring, a screw type fastener, or any other type of fastener that prevents fluid from leaking from the boundary between the main body and the second replaceable top cap when the second replaceable top cap is secured to the top of the main body.

The second replaceable top cap may comprise the concave shaped portion as viewed from outside of the main body. The concave shaped portion of the second replaceable top cap may be adapted for shaking by the user with the concave shaped portion forming a grip where the second replaceable top cap may be firmly grasped when in use.

The inside of the second replaceable top cap may comprise a plurality of spikes. The plurality of spikes may be pyramidal projections of the cap material into the interior space of the main body from the convex side of the second replaceable top cap. The plurality of spikes may be arranged into a plurality of concentric rings. One of the plurality of spikes may be located at the center of the second replaceable top cap. In some embodiments, the plurality of spikes may extend from the inside of the second replaceable top cap to a length such that the tips of the plurality of spikes are coplanar.

The second replaceable top cap may separate the one or more cloves of garlic from each other and may peel the skin off of the one or more cloves when the one or more cloves are placed inside of the main body, the second replaceable top cap is placed onto the top of the main body, and the main body is shaken for a predetermined period of time. The second replaceable top cap may then be removed and the one or more cloves and separated peels may be removed.

Figure Descriptions

Turning now to FIG. 1, the figure illustrates the personal egg peeler comprising the main body 104, the bottom end cap 110, and the top end cap 106 along with the first replaceable top cap 150 and the second replaceable top cap 170. The first replaceable top cap 150 is a replacement cap for the top end cap 106. The first replaceable top cap 150 reconfigures the personal egg peeler for separating the egg yolks from the egg whites. The second replaceable top cap 170 is a replacement cap for the top end cap 106. The second replaceable top cap 170 reconfigures the personal egg peelers for separating and peeling the one or more cloves of garlic. The concave shaped portion 118 of the bottom end cap 110 can be seen through wall of the main body 104, where it appears as a convex bump on the inside of the main body 104.

Figure 2A:
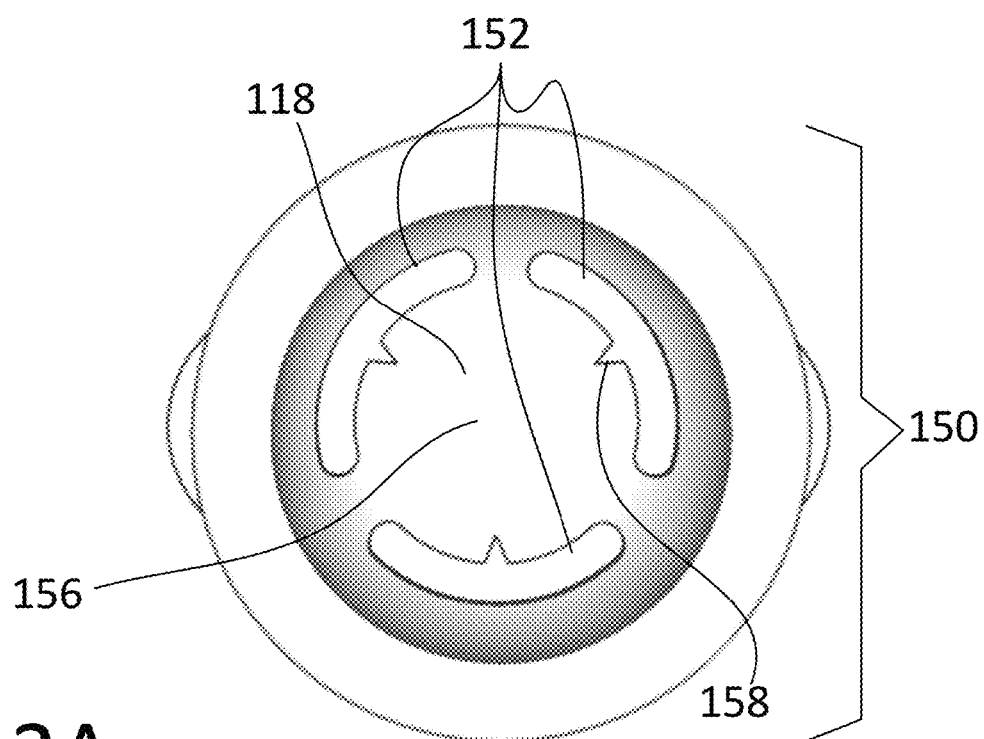
FIG. 2A is a top view of the first replaceable top cap consistent with certain embodiments of the present invention.

Turning now to FIG. 2A, the figure illustrates the top of the first replaceable top cap 150. The concave shaped portion 118 extends away from the viewer in this view, forming the central depression 156. The plurality of slots 152 are apparent along with the V-shaped notch 158 on each of the plurality of slots 152.

Figure 2B:
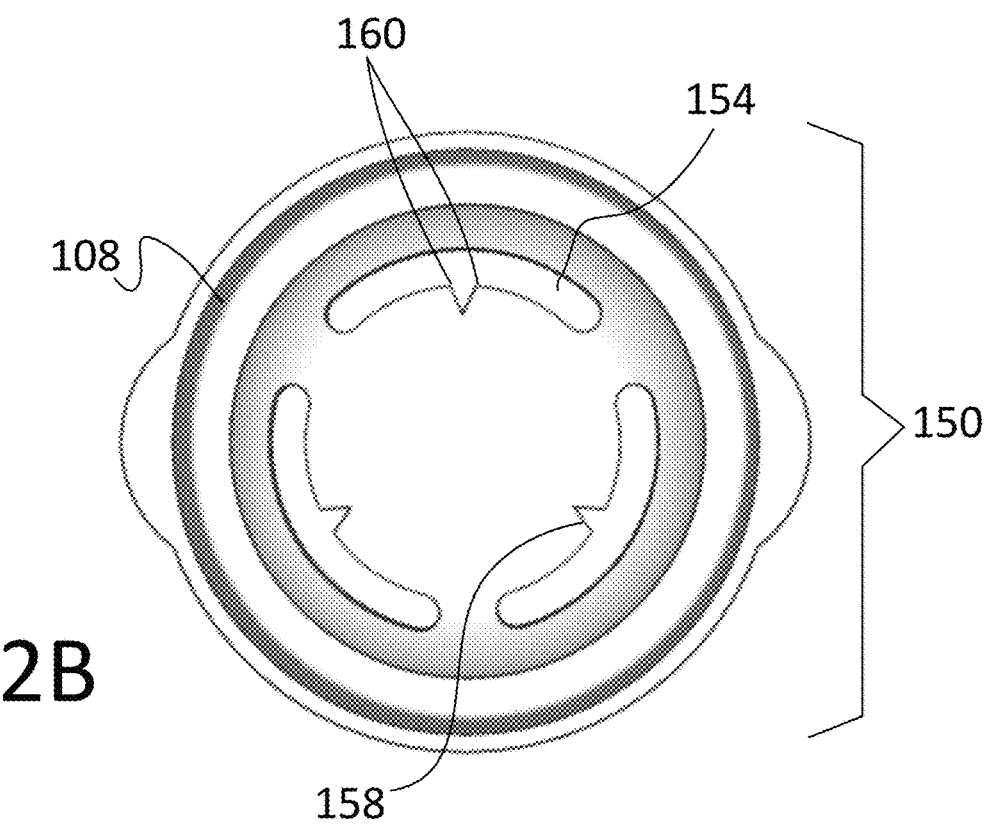
FIG. 2B is a bottom view of the first replaceable top cap consistent with certain embodiments of the present invention.

Turning now to FIG. 2B, the figure illustrates the bottom of the first replaceable top cap 150. The sealing element 108 can be seen where the first replaceable top cap 150 fits against the main body 104. The angular corners 160 formed by the V-shaped notch 158 are also shown.

Figure 2C:
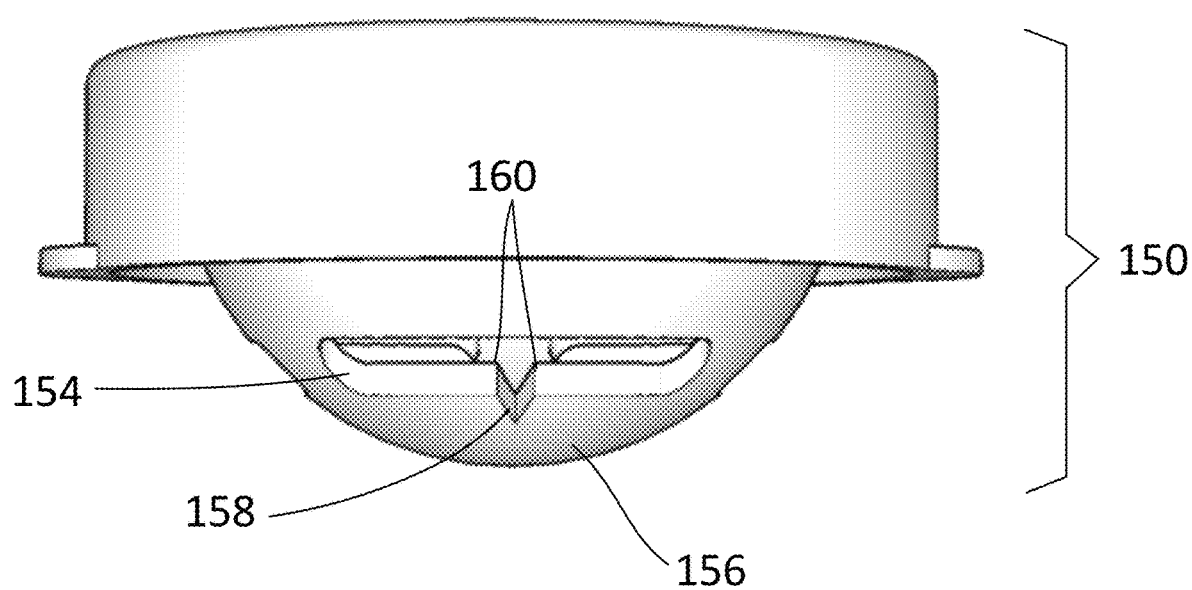
FIG. 2C is a side view of the first replaceable top cap consistent with certain embodiments of the present invention.

Turning now to FIG. 2C, the figure illustrates the side of the first replaceable top cap 150. The first replaceable top cap 150 is turned so that one of the individual slots 154 is facing the viewer to highlight the V-shaped notch 158 and the angular corners 160. It can also be seen that the central depression 156 extends to the lowest point of the first replaceable top cap 150, below the line of the plurality of slots 152.

Figure 3A:
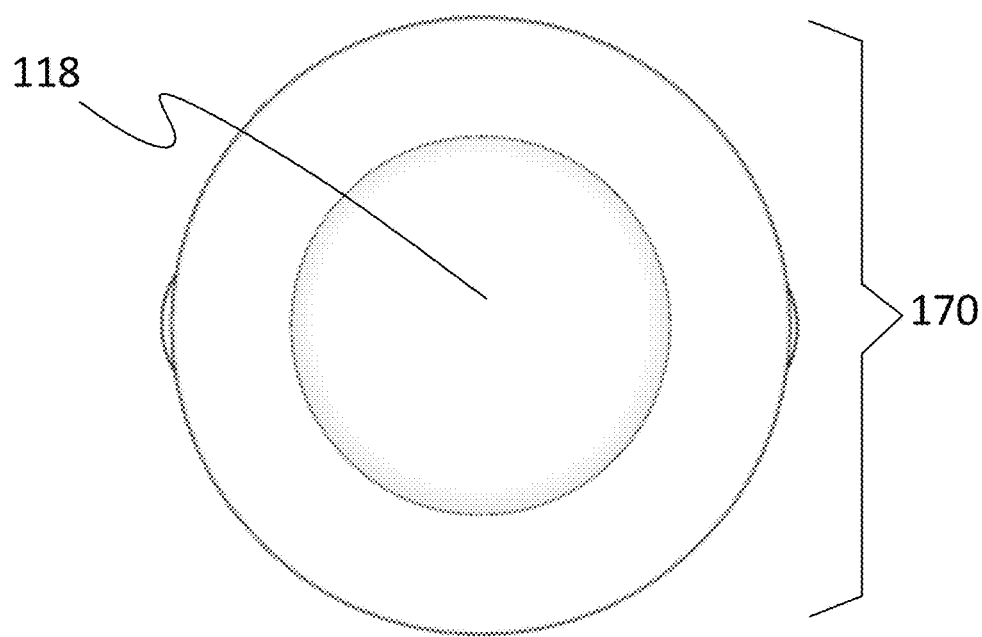
FIG. 3A is a top view of the second replaceable top cap consistent with certain embodiments of the present invention.

Turning now to FIG. 3A, the figure illustrates the top of the second replaceable top cap 170. From this vantage point, the second replaceable top cap 170 is relatively featureless and indistinguishable from the top end cap 106 that is used for removing shells from hard boiled eggs/ The concave shaped portion 118 extends away from the viewer in this view.

Figure 3B:
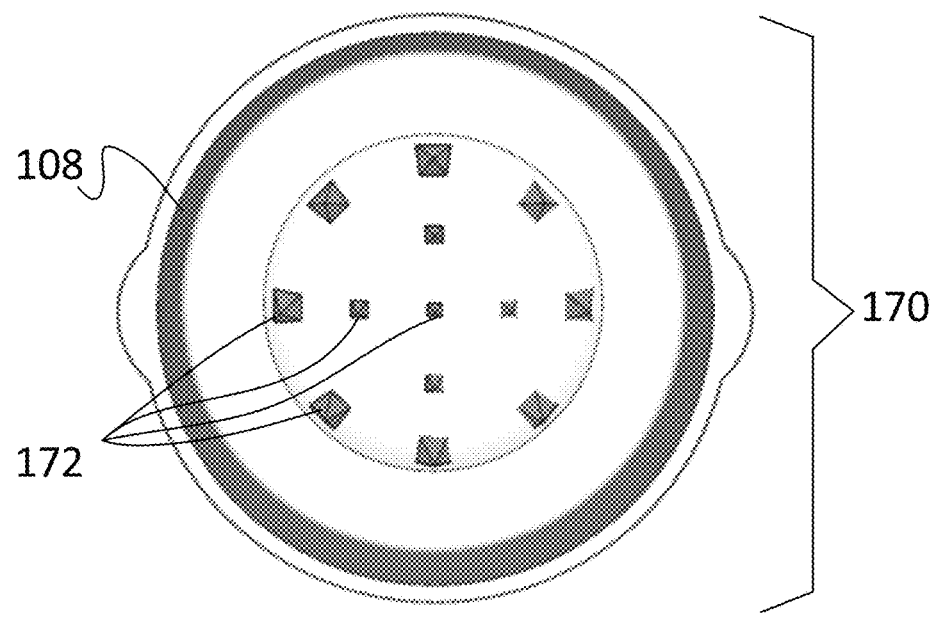
FIG. 3B is a bottom view of the second replaceable top cap consistent with certain embodiments of the present invention.

Turning now to FIG. 3B, the figure illustrates the bottom of the second replaceable top cap 170. It can be seen that the second replaceable top cap 170 is similar to the top end cap 106 used to remove shells from hard boiled eggs with the addition of the plurality of spikes 172. The sealing element 108 between the second replaceable top cap 170 and the main body 104 is also highlighted in this view.

Figure 3C:
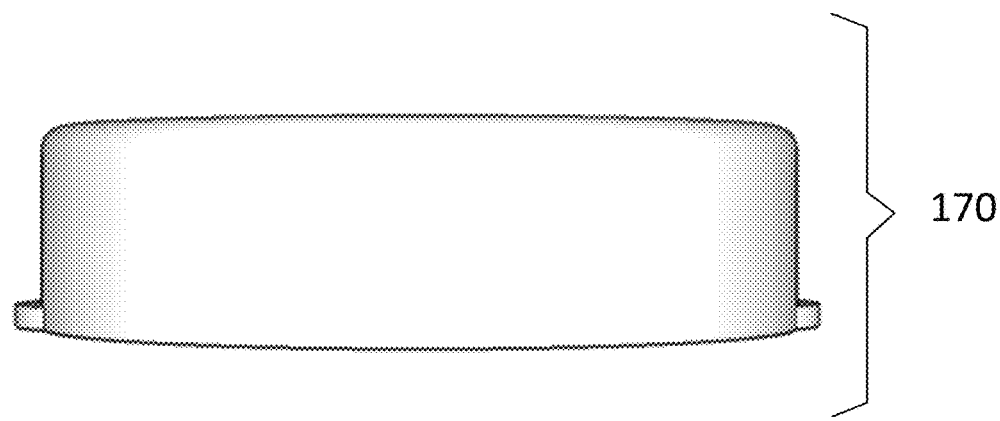
FIG. 3C is a side view of the second replaceable top cap consistent with certain embodiments of the present invention.

Turning now to FIG. 3C, the figure illustrates the side of the second replaceable top cap 170. The plurality of spikes 172 do not extend low enough to be visible in this side view.

Figure 3D:
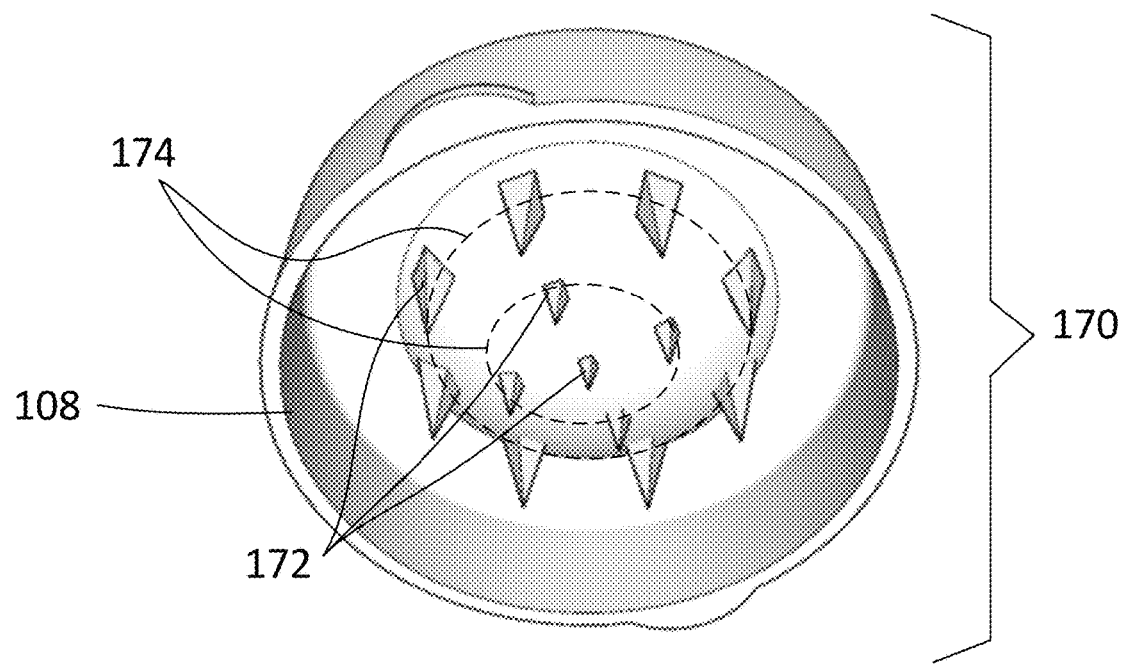
FIG. 3D is a low angle perspective view of the second replaceable top cap consistent with certain embodiments of the present invention.

Turning now to FIG. 3D, the figure illustrates a perspective view of the second replaceable top cap 170 from a position below the second replaceable top cap 170. From this angle, the plurality of spikes 172 and their arrangement into the plurality of concentric rings 174 is readily apparent. The sealing element 108 is also shown in this view.

Figure 4:
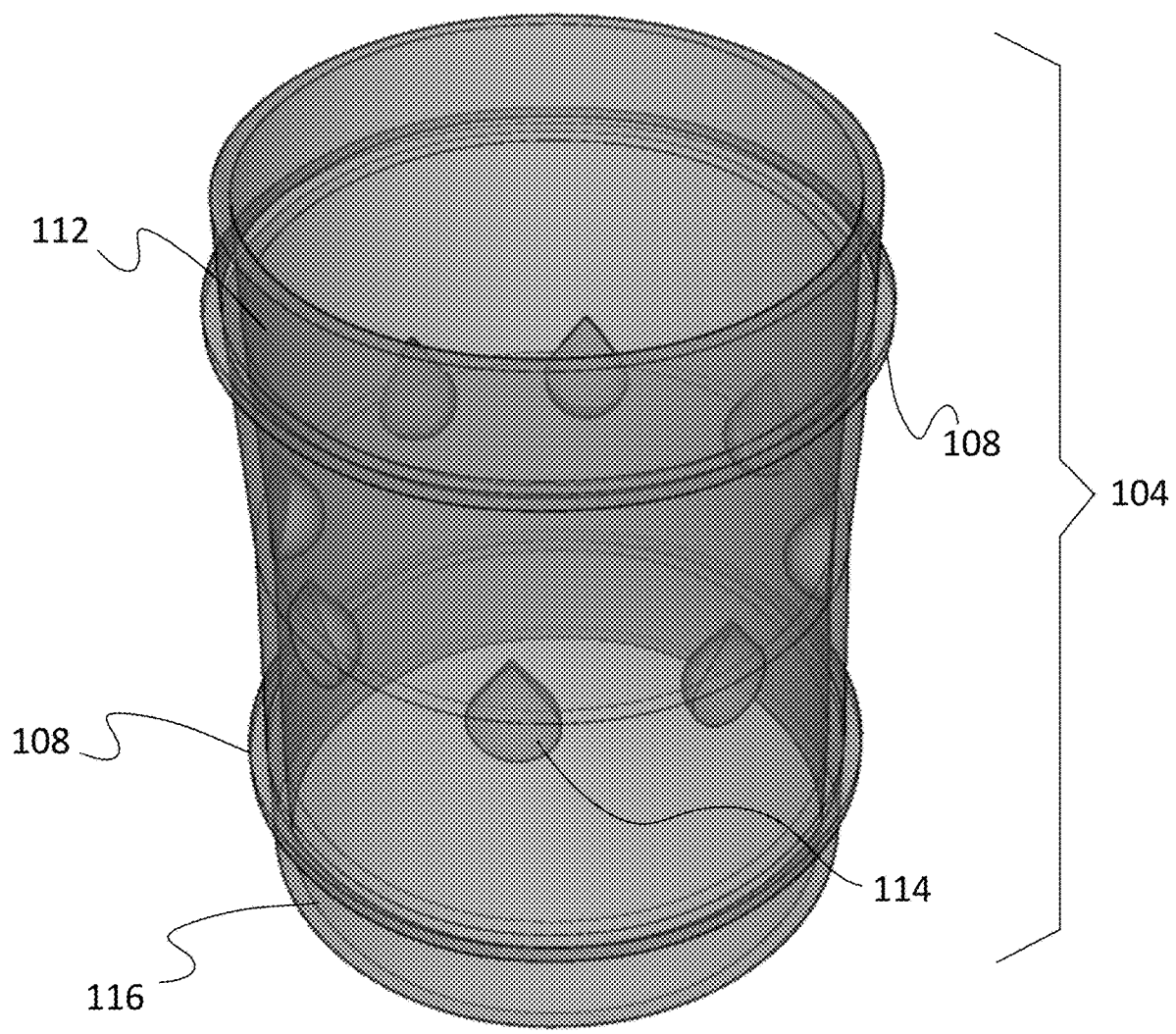
FIG. 4 is a perspective view of the body of the egg peeler consistent with certain embodiments of the present invention.

Turning now to FIG. 4, the figure illustrates the main body 104 onto which the first replaceable top cap 150 or the second replaceable top cap 170 may be placed. The bottom end cap 110 is removed in this view. The figure shows the top connector portion 112 where the first replaceable top cap 150 or the second replaceable top cap 170 may be installed and the sealing element 108 associated with the top connector portion 112. The figure also shows the bottom connector portion 116 where the bottom end cap 110 may be installed and the sealing element 108 associated with the bottom connector portion 116. Finally, the figure illustrates the location of the plurality of raised protrusions 114 on the inside of the main body 104.

While certain illustrative embodiments have been described, it is evident that many alternatives, modifications, permutations and variations will become apparent to those skilled in the art in light of the foregoing description.

What is claimed is:

1. Egg peeler assembly comprising:
a personal egg peeler;
one or more replaceable top end caps and bottom end caps for the personal egg peeler where each of said replaceable top end caps and bottom end caps has a concave shape adapted for a human grip;
where the personal egg peeler comprises a main body, a first bottom end cap, and a first top end cap where each of said first top end cap and first bottom end cap is removable and further comprises a sealing element to form a watertight seal between said first top end cap, first bottom end cap, and the main body;
said personal egg peeler further comprises raised protrusions within said main body where said main body is cylindrical in cross-section and is of sufficient diameter to permit the insertion of one or more eggs produced by a commercial variety hen;
where the first top end cap is configured to be removed from the main body of the personal egg peeler and replaced by one of the one or more replaceable top end caps;
where the one or more replaceable top end caps configure the personal egg peeler to perform a specific task;
said one or more replaceable top end caps further comprises a peeler top cap comprised of a rigid material and configured to peel one or more cloves of garlic as said specific task; said peeler top cap having a concave shape and comprises a plurality of pyramidal spikes projecting into the interior space of said main body, where said plurality of pyramidal spikes are arranged in concentric rings and project from the convex side of said peeler top cap.

2. The egg peeler assembly according to claim 1, where one of the plurality of spikes is located at the center of the peeler top cap.

3. The egg peeler assembly according to claim 1, where the plurality of spikes extends from the inside of the peeler top cap to a length such that the tips of the plurality of spikes are coplanar.

4. The egg peeler assembly according to claim 3, where when the one or more cloves of garlic is placed inside of the main body, the peeler top cap is placed onto the top of the main body, and when the main body is shaken for a predetermined period of time, the peeler top cap separates the one or more cloves of garlic from each other and peels the skin off of the one or more cloves.

5. An egg peeler assembly comprising:
a personal egg peeler;
one or more replaceable top end caps and bottom end caps for the personal egg peeler where each of said replaceable top end caps and bottom end caps have a concave shape adapted for a human grip;
where the personal egg peeler comprises a main body, a first bottom end cap, and a first top end cap where each of said first top end cap and first bottom end cap is removable and further comprises a sealing element to form a watertight seal between said first top end cap, and first bottom end cap, and the main body;
said personal egg peeler further comprises raised protrusions within said main body, where said main body is cylindrical in cross-section and is of sufficient diameter to permit the insertion of one or more eggs produced by a commercial variety hen;
where the first top end cap is configured to be removed from the main body of the personal egg peeler of replaced by one of the one or more replaceable top end caps;
where the one or more replaceable top end caps configure the personal egg peeler to perform a specific task;
where said one or more replaceable top end caps further comprises a separator top cap comprised of a rigid material and configured to separate egg whites from egg yolks as said specific task;
where said separator top cap comprises a plurality of slots in the shape of an arc of a circle, where the distance from the center to the separator top cap to any point on a line traversing the center of the individual slot is a constant for each of the plurality of slots;
where the width of the plurality of slots as measured from the lowest edge of the individual slot to the highest edge of the individual slot at any location on the individual slot except at a V-shaped notch or at the ends is such that the egg white flow through the individual slot unimpeded.

6. The egg peeler assembly according to claim 5, where the distance from the center of said separator top cap to the lowest edge of the plurality of slots is such that at least one of the egg yolks is contained within a central depression without reaching the plurality of slots;
where the central depression is the concave shaped portion bounded by the plurality of slots.

7. The egg peeler assembly according to claim 6, where there are three of the individual slots comprising the plurality of slots.

8. The egg peeler assembly according to claim 6, where each of the individual slots comprises the V-shaped notch;
where the V-shaped notch is an opening in said separator top cap where the egg white begins to flow from the top side of a second replaceable top end cap through the plurality of slots and into the main body;
where the V-shaped notch is a V-shaped portion of a material removed from the center of the bottom edge of the individual slot;
where the V-shaped notch creates two angular corners;
where the angular corners cut a membrane of the egg so that the membrane does not pull on the egg yolk and break the egg yolk.

9. The egg peeler assembly according to claim 8, where when the egg is cracked open, the contents of the egg are pouted into the concave shaped portion of said separator top cap from the top, and when the main body is rocked, the egg white and the membrane flow through the plurality of slots into the main body;

where the egg yolk remains inside said separator top cap;

where the egg white is collected inside of the main body.

* * * * *